(12) United States Patent
Huang (10) Patent No.: US 8,166,659 B2
(45) Date of Patent: May 1, 2012

(54) GARDEN SHEARS

(75) Inventor: Yao-Chung Huang, Fu Shing Hsiang (TW)

(73) Assignee: Ho Cheng Garden Tools Co., Ltd., Fu Shing Hsiang, Chang Hua Hsien (TW)

( * ) Notice: Subject to any disclaimer, the term of this patent is extended or adjusted under 35 U.S.C. 154(b) by 389 days.

(21) Appl. No.: 12/626,906

(22) Filed: Nov. 29, 2009

(65) Prior Publication Data

US 2011/0126415 A1  Jun. 2, 2011

(51) Int. Cl.
  *B26B 13/00*  (2006.01)
  *B26B 17/00*  (2006.01)

(52) U.S. Cl. ............... 30/254; 30/190; 30/192; 30/245; 30/251

(58) Field of Classification Search ............ 30/190, 30/192, 244, 245, 249–251, 254; D8/5
See application file for complete search history.

(56) References Cited

U.S. PATENT DOCUMENTS

| | | | | |
|---|---|---|---|---|
| 25,140 A * | 8/1859 | Roome | | 30/251 |
| 103,197 A * | 5/1870 | Kellogg | | 30/254 |
| 488,959 A * | 12/1892 | Brandenburg | | 30/250 |
| 1,065,753 A * | 6/1913 | Whitney | | 30/250 |
| 1,204,482 A * | 11/1916 | Parker | | 30/251 |
| 1,368,244 A * | 2/1921 | Desrochers | | 30/251 |
| 1,577,140 A * | 3/1926 | Mitchell | | 30/250 |
| 2,512,334 A * | 6/1950 | Johnson | | 30/251 |
| 2,816,359 A * | 12/1957 | Hogue et al. | | 30/250 |
| 3,851,389 A * | 12/1974 | Swanson | | 30/250 |
| 4,178,682 A * | 12/1979 | Sadauskas | | 30/250 |
| 4,980,975 A * | 1/1991 | Hodson | | D8/5 |
| 5,159,757 A * | 11/1992 | Weid et al. | | 30/251 |
| 5,325,591 A * | 7/1994 | Orthey | | 30/250 |
| 5,689,888 A * | 11/1997 | Linden | | 30/250 |
| 5,809,654 A * | 9/1998 | Huang | | 30/250 |
| D401,485 S * | 11/1998 | Liao | | D8/5 |
| 5,970,617 A * | 10/1999 | Chang | | 30/249 |
| D434,286 S * | 11/2000 | Lin | | D8/5 |
| D437,751 S * | 2/2001 | Lin | | D8/5 |
| 6,345,446 B1 * | 2/2002 | Huang | | 30/250 |
| D464,854 S * | 10/2002 | Lai | | D8/5 |
| D479,960 S * | 9/2003 | Huang | | D8/5 |
| D481,273 S * | 10/2003 | Huang | | D8/5 |
| 6,681,492 B1 * | 1/2004 | Huang | | 30/250 |
| D497,784 S * | 11/2004 | Picaza | | D8/5 |
| 6,829,829 B1 * | 12/2004 | Huang | | 30/245 |

(Continued)

FOREIGN PATENT DOCUMENTS

GB  2444912 A  *  6/2008

(Continued)

*Primary Examiner* — Jason Daniel Prone (57) ABSTRACT

A garden shears has a first shear, a second shear, a separator, an engaging member and two joined pressing arms. A cutting portion of the first shear is offset from the handle portion, and central portion has a centrally positioned first pivot hole and a first eccentric pivot hole. A central portion of the second shear has a second pivot hole. A side of the second shear has a strip-shaped extending portion with an end bent towards the other side of the second shear and having an engaging gear rack, which defines an escape region. An arcuate limiting guide groove is disposed between the second pivot hole above the escape region. The engaging member has an arcuate engaging tip edge with a protrusion. The pressing arms are bi-leveled with a beveled connection and have a handle at a lower portion and a second eccentric pivot hole at an upper portion.

3 Claims, 9 Drawing Sheets

U.S. PATENT DOCUMENTS

| | | | | |
|---|---|---|---|---|
| 7,530,172 B1 * | 5/2009 | Wu | | 30/244 |
| 7,640,666 B1 * | 1/2010 | Huang | | 30/254 |
| 7,810,242 B1 * | 10/2010 | Lynch | | 30/254 |
| D634,594 S * | 3/2011 | Huang | | D8/5 |
| D634,993 S * | 3/2011 | Huang | | D8/5 |
| D634,994 S * | 3/2011 | Huang | | D8/5 |
| D634,995 S * | 3/2011 | Huang | | D8/5 |
| D638,674 S * | 5/2011 | Huang | | D8/5 |
| D638,675 S * | 5/2011 | Huang | | D8/5 |
| D638,676 S * | 5/2011 | Huang | | D8/5 |
| D638,677 S * | 5/2011 | Huang | | D8/5 |
| 7,946,039 B2 * | 5/2011 | Erbrick | | 30/251 |
| 8,024,864 B2 * | 9/2011 | Mortensen | | 30/250 |
| 2003/0106223 A1 * | 6/2003 | Lee | | 30/249 |
| 2003/0136008 A1 * | 7/2003 | Lin | | 30/250 |
| 2009/0293288 A1 * | 12/2009 | Hernandez | | 30/251 |
| 2010/0043238 A1 * | 2/2010 | Linden et al. | | 30/251 |
| 2010/0269357 A1 * | 10/2010 | Shan | | 30/254 |
| 2011/0214293 A1 * | 9/2011 | Huang | | 30/251 |
| 2012/0017445 A1 * | 1/2012 | Huang | | 30/192 |

FOREIGN PATENT DOCUMENTS

| | | | |
|---|---|---|---|
| GB | 2459449 A | * | 10/2009 |
| GB | 2466358 A | * | 6/2010 |
| JP | 52024396 A | * | 2/1977 |

* cited by examiner

GARDEN SHEARS

BACKGROUND OF THE INVENTION

1. Field of the Invention

The present invention relates to garden shears, and more particularly to garden shears which are able to evenly disperse the cutting counterforce and which limit a maximum opening range of the garden shears.

2. Description of the Related Art

More and more people enjoy having plants in their daily environments; therefore, garden tools are becoming increasingly popular. Garden shears are used for trimming plants. Please refer to FIG. 8. A prior art garden shears has a metal lever 60, a first member 70 and a second member 80. The metal lever 60 has a first pivot joint 61, a blade 62 and an arm 63 having a second pivot joint 64. The second pivot joint 64 and the first pivot joint 61 are separated from each other by a predetermined distance. The first member 70 is pivoted onto the first pivot joint 61 and connected to the metal bar lever. The first member 70 further has an extended jaw 71 coupled with the blade 62 and is able to cut an object placed in a space formed by the extended jaw 71. The first member 70 further has an extended arm 72 and a first fan-shaped gear 73 disposed between the extended jaw 71 and the extended arm 72. The second member 80 has an extending portion 81 and a second fan-shaped gear 82. The second member 80 is pivoted onto the second pivot joint 64 and connected to the metal lever 60 such that the first and second fan-shaped gears 73, 82 are engaged with each other for relative movement.

Figure 8:
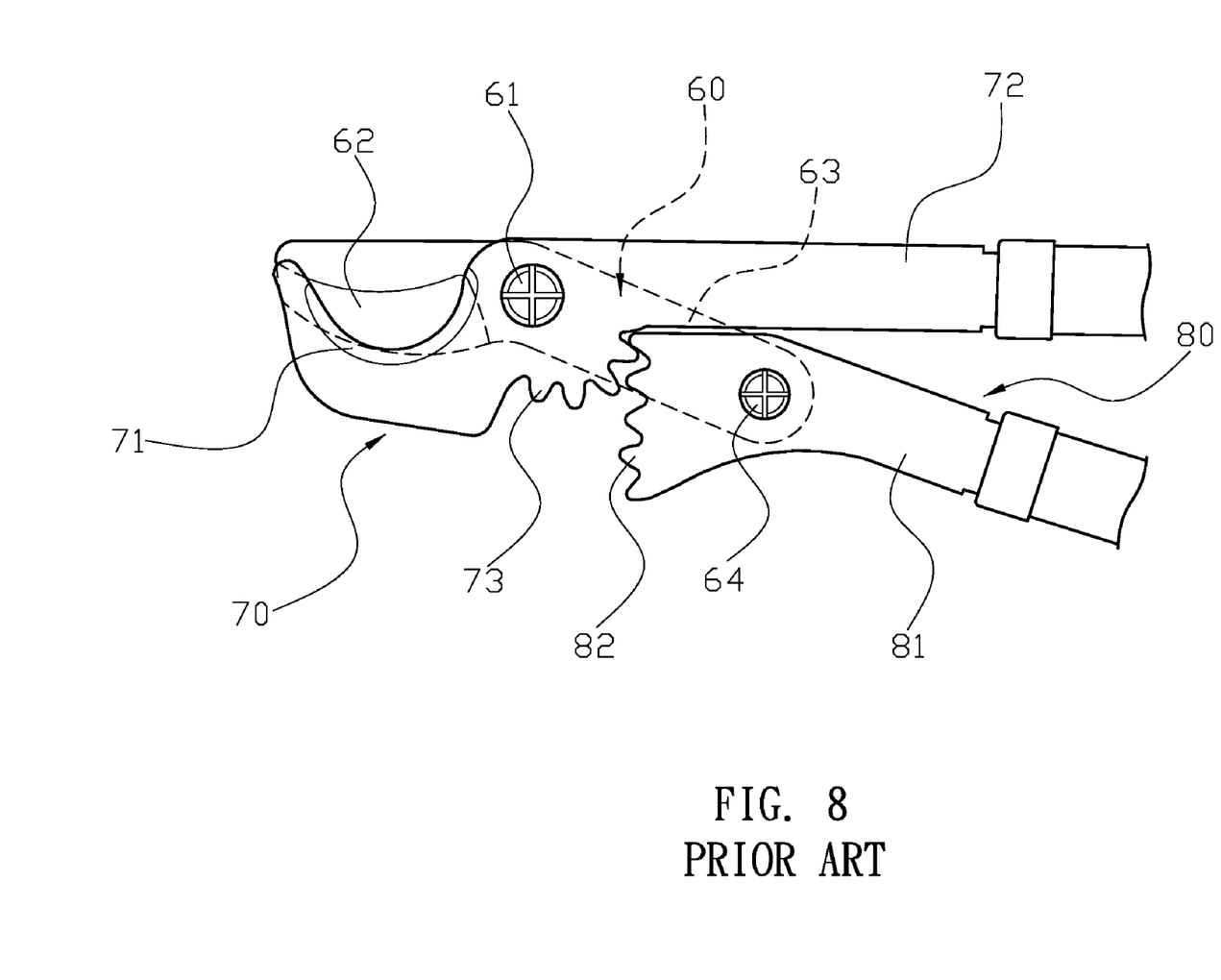
FIG. 8 is a schematic drawing of a prior art structure.
Figure 9:
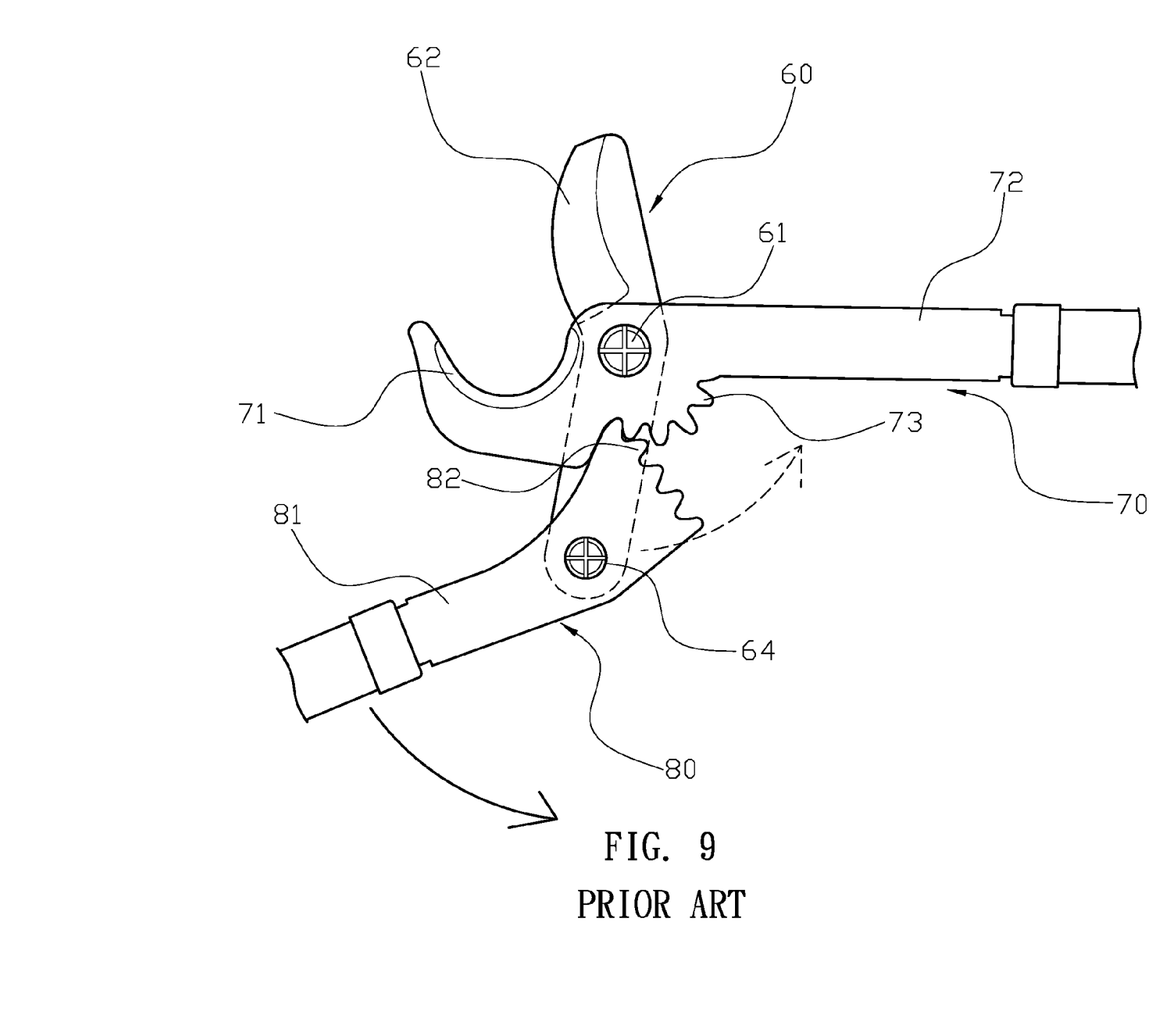
FIG. 9 is a drawing showing operation of the prior art structure.

However, the prior art structure has the following drawbacks: 1. The first member 70 and the second member 80 are both disposed on the same side of the metal lever 60; when the cutting motion is performed and a counterforce is generated, the counterforce is concentrated at the engaging area of the first member 70 and the second member 80 and is not evenly dispersed over both sides; therefore, the cutting motion is affected by the unbalanced stresses and is made more difficult. 2. The first member 70 and the second member 80 are simply pivoted together and are unable to restrict each other. Therefore, when the first and second members 70, 80 are respectively rotated in opposite directions during the cutting operation, the first and second members 70, 80 can easily become accidentally separated by a maximum angle, which is not usable because the blade 62 requires a proper cutting angle between the object. Furthermore, when the first and second members 70, 80 are too far apart, more effort is required to close them together which is very inconvenient for users.

Therefore, it is desirable to provide garden shears to mitigate and/or obviate the aforementioned problems.

SUMMARY OF THE INVENTION

An objective of the present invention is to provide garden shears, which are able to evenly disperse the cutting counterforce and which limit a maximum opening range of the garden shears.

In order to achieve the above-mentioned objective, the garden shears comprise a first shear, a second shear, a separator, an engaging member and two joined pressing arms that are all assembled together with a plurality of screws and nuts. A handle portion of the first shear is offset from a first cutting portion of the first shear, and a central portion of the first shear comprises a centrally positioned first pivot hole and a first eccentric pivot hole offset from and below the first pivot hole. The first cutting portion is coupled to the upper portion of the first shear. The first cutting portion is an anvil or a blade. The second shear comprises a second pivot hole at its central portion. A side of the second shear has a strip-shaped extending portion, and an end of the extending portion is bent towards the other side of the second shear and has an engaging gear rack. The extending portion defines an escape region. An arcuate limiting guide groove is disposed between the second pivot hole and the extending portion above the escape region. An upper portion of the second shear comprises a second cutting portion. The cutting portion may be an anvil or a blade. The separator has two assembly holes. The engaging member comprises an arcuate engaging tip edge and a protrusion above one end of the engaging tip edge; the protrusion portion has two assembly holes. The pressing arms are each bi-leveled with a beveled connection and have a handle at a lower portion and a second eccentric pivot hole at an upper portion; two assembly holes are disposed below the second eccentric pivot hole.

With the above-mentioned garden shears, the following benefits can be obtained: 1. The second shear is sandwiched between the two pressing arms; when a counterforce is generated because of the applied force, the counterforce is evenly distributed across the two pressing arms disposed on two sides of the second shear instead of being concentrated on a single side, which would otherwise difficulties in operation. 2. Since the screw moves along the limiting guide groove, a maximum opening angle between the first and second cutting portions is limited; the user does need to waste time to close the first and second cutting portions. Furthermore, the range of the limiting guide groove corresponds to the usable range of the garden shears, so the first and second cutting portions will not be separated with too narrow an angle, which would otherwise lead to difficult operations.

Other objects, advantages, and novel features of the invention will become more apparent from the following detailed description when taken in conjunction with the accompanying drawings.

DETAILED DESCRIPTION OF THE PREFERRED EMBODIMENT

Figure 2:
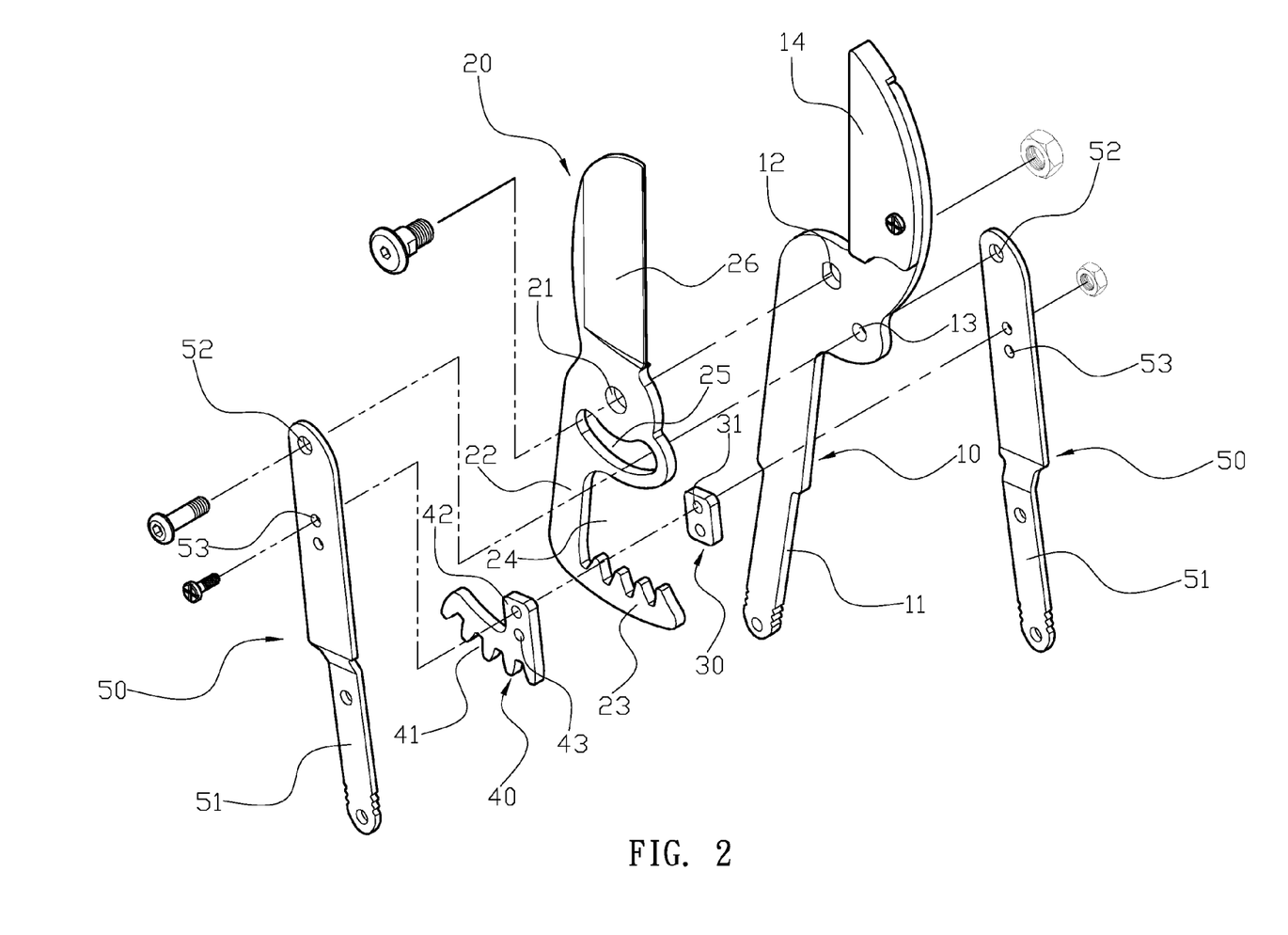
FIG. 2 is an exploded perspective view of an embodiment of the present invention.
Figure 3:
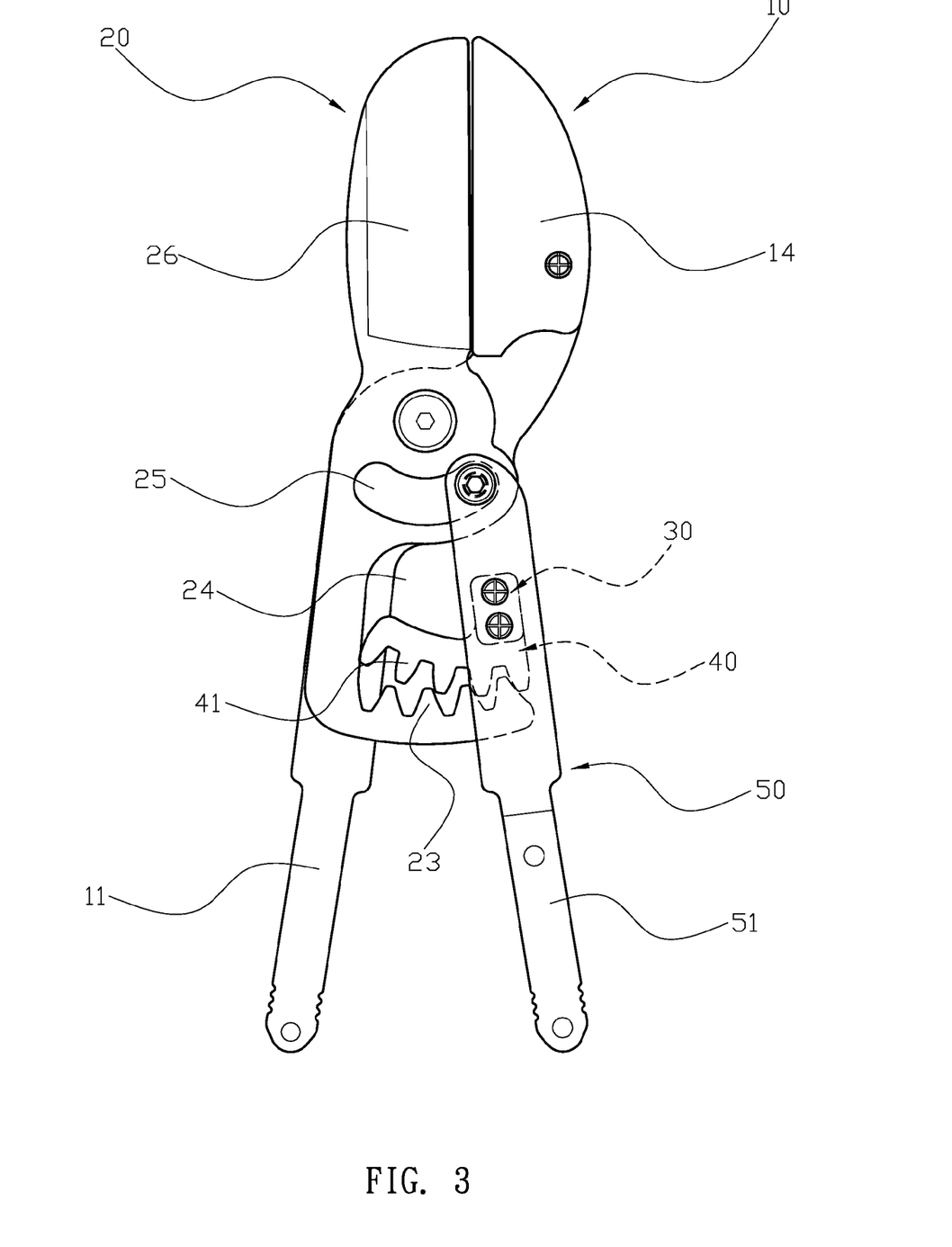
FIG. 3 is a front view of an embodiment of the present invention.

Please refer to FIG. 2 and FIG. 3. Garden shears comprise a first shear 10, a second shear 20, a separator 30, an engaging member 40 and two joined pressing arms 50 that are all assembled together with a plurality of screws and nuts. A handle portion 11 of the first shear 10 is offset from a first cutting portion 14 of the first shear 10, and a central portion of the first shear 10 comprises a centrally positioned first pivot hole 12 and a first eccentric pivot hole 13 offset from and below the first pivot hole 12. The first cutting portion 14 is coupled to the upper portion of the first shear 10. The first cutting portion 14 is an anvil or a blade. The second shear 20 comprises a second pivot hole 21 at its central portion. A side of the second shear has a strip-shaped extending portion 22, and an end of the extending portion 22 is bent towards the other side of the second shear 20 and has an engaging gear rack 23. The extending portion 22 defines an escape region 24. An arcuate limiting guide groove 25 is disposed between the second pivot hole 21 and the extending portion 22 above the escape region 24. An upper portion of the second shear 20 comprises a second cutting portion 26. The cutting portion 26 may be an anvil or a blade. The separator 30 has two assembly holes 31. The engaging member 40 comprises an arcuate engaging tip edge 41 and a protrusion 42 above one end of the engaging tip edge 41; the protrusion portion 42 has two assembly holes 43. The pressing arms 50 are each bi-leveled with a beveled connection and have a handle 51 at a lower portion and a second eccentric pivot hole 52 at an upper portion; two assembly holes 53 are disposed below the second eccentric pivot hole 52.

Figure 1:
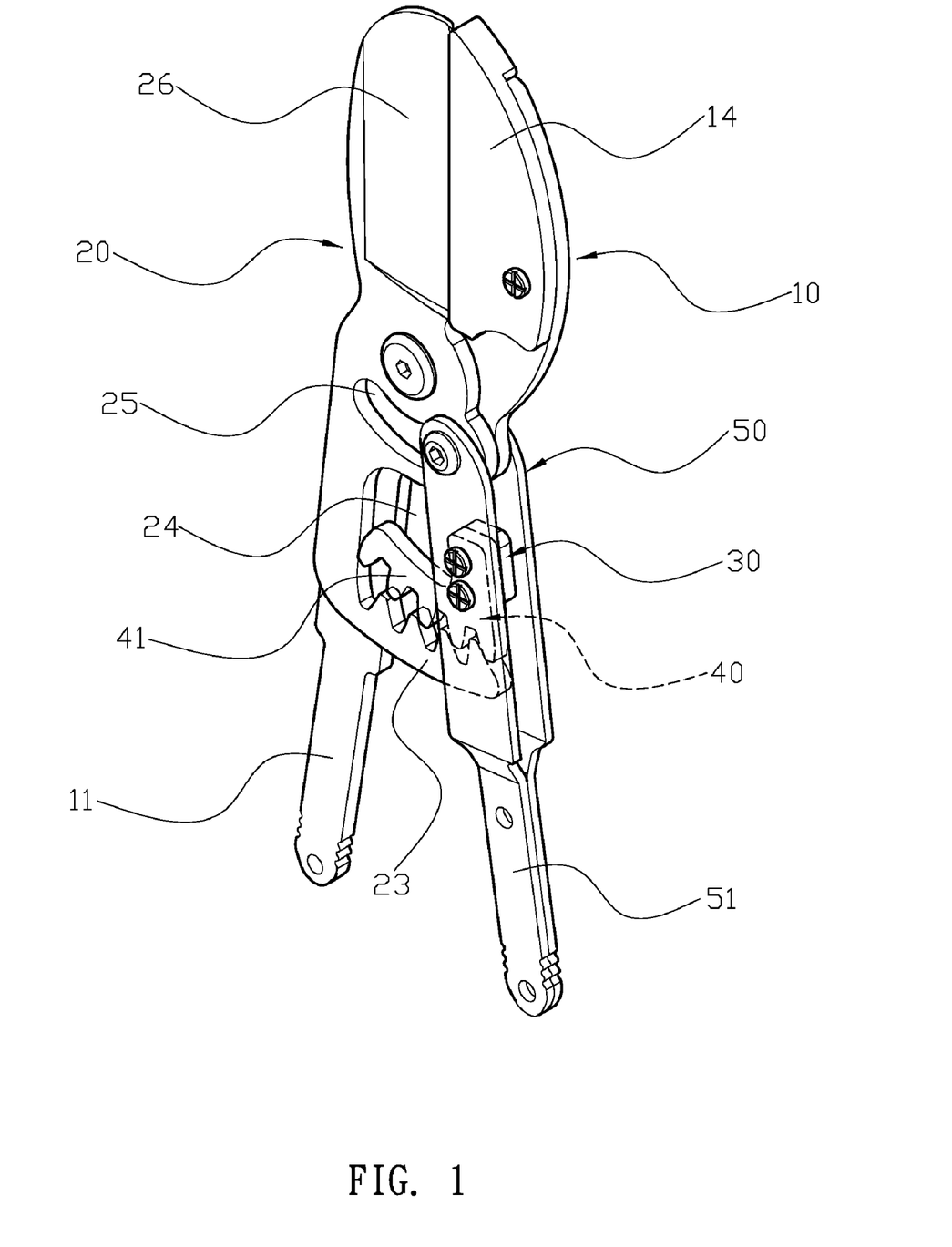
FIG. 1 is a perspective view of an embodiment of the present invention.

For a structural assembly of the present invention, please refer to FIG. 1 and FIG. 3. The second shear 20 and the first shear 10 are coupled via the first pivot hole 12 the second pivot hole 21, such that the second shear 20 overlaps one side of the first shear 10. The separator 30 overlaps the protrusion portion 42 of the engaging member 40 and is disposed in the escape region 24 of the second shear 20 with the engaging member 40, such that the engaging gear rack 23 engages with the engaging tip edge 41. The two pressing arms 50 are paired together to sandwich the first shear 10, the second shear 20, the separator 30 and the engaging member 40, a screw is placed through and locked with the second eccentric pivot hole 52 of the pressing arms 50, the limiting guide groove 25 of the second shear 20 and the first eccentric pivot hole 13 of the first shear 10. Therefore, the assembly holes 31, 43, and 53 of the separator 30, the engaging member 40 and the pressing arms 50 are aligned and secured with screws and nuts. Accordingly, the first shear 10 and the second shear 20 are capable of a relative limited closing and opening motion with each other by utilizing the screws to move along the limiting guide groove 25.

Figure 4:
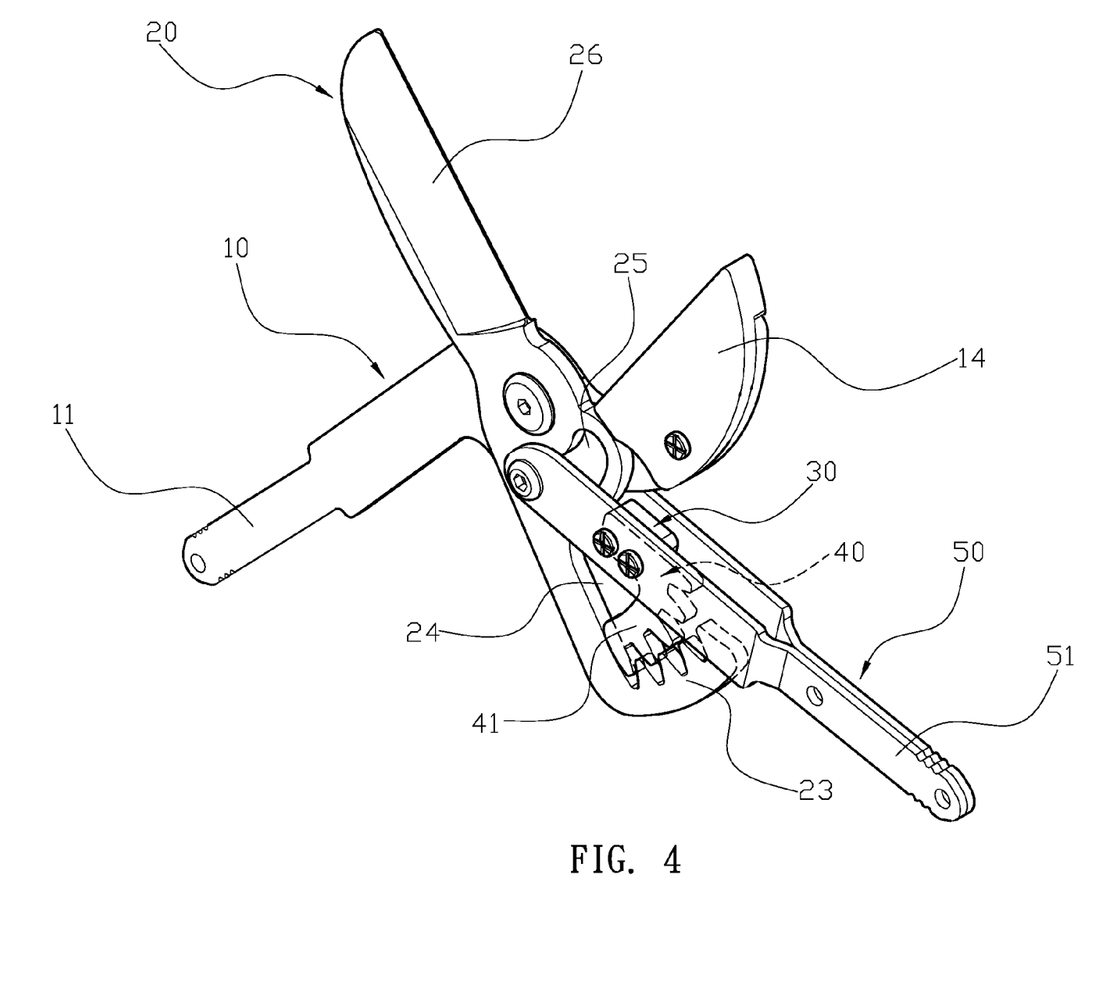
FIG. 4 is a perspective view showing a cutting portion being opened according to an embodiment of the present invention.
Figure 5:
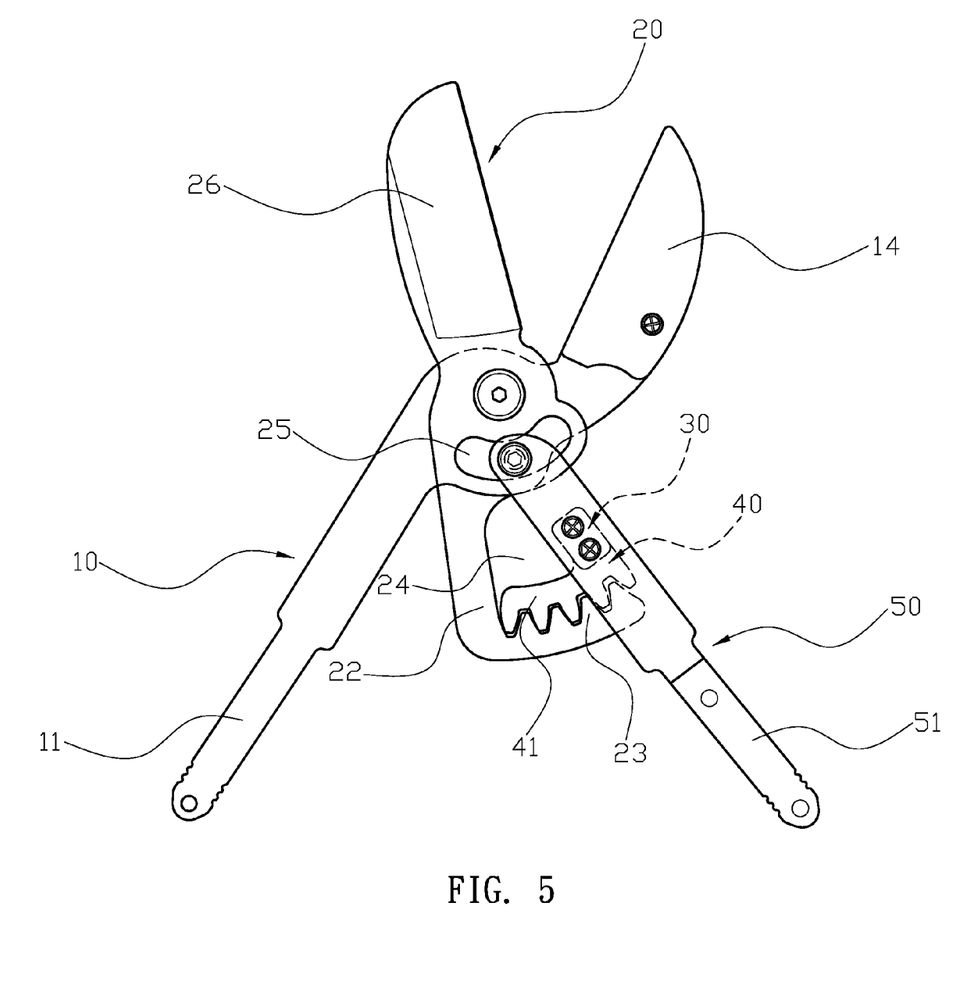
FIG. 5 is a schematic drawing of a cutting portion being opened according to an embodiment of the present invention.
Figure 6:
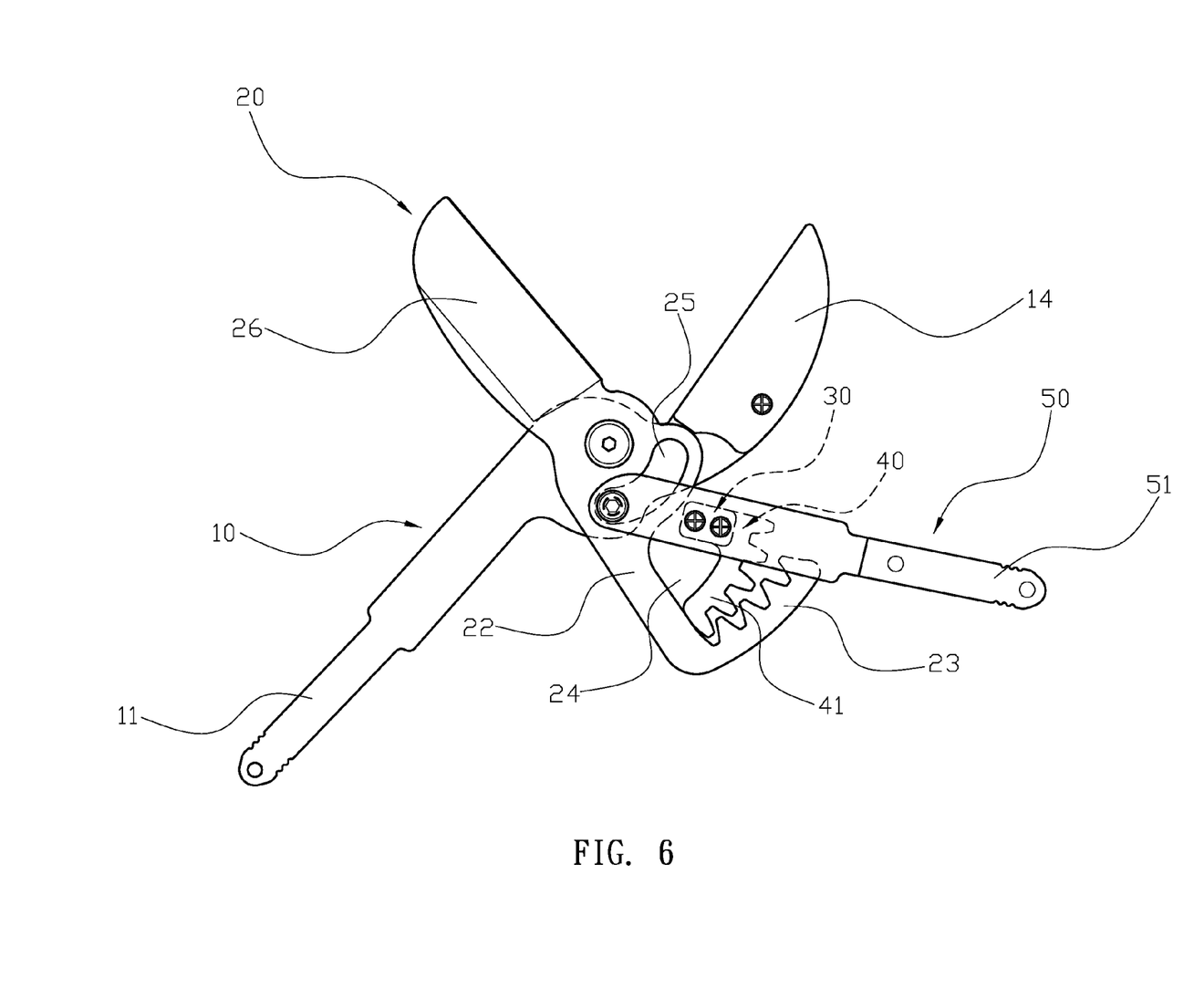
FIG. 6 is a schematic drawing of a cutting portion being opened to a maximum extent according to an embodiment of the present invention.

During actual operations, the first shear 10 and the second shear 20 pivot around the first pivot hole 12 and the second pivot hole 21, and the first shear 10 and the paired handles 11, 51 of the pressing arms 50 are all able to be forced opened. When the first shear 10 and the paired handles 11, 51 of the pressing arms 50 are forced to open around the first and second pivot holes 12,21, the screw passing through the first and second eccentric pivot holes 13, 52 is able to move along the limiting guide groove 25. When the pressing arms 50 are opened wider and wider, the second shear 20 is driven apart from the first and second cutting portions 14, 26 due to the engagement between the engaging gear rack 23 and the engaging tip edge 41. Please refer to FIG. 4 and FIG. 5. The separated first and second cutting portions 14, 26 can be used for cutting objects with an external force applied in opposite directions. Since the screw moves along the limiting guide groove 25, a maximum opening angle between the first and second cutting portions 14, 26 is limited, as shown in FIG. 6. Therefore, the user does need to waste time to close the first and second cutting portions 14, 26.

Figure 7:
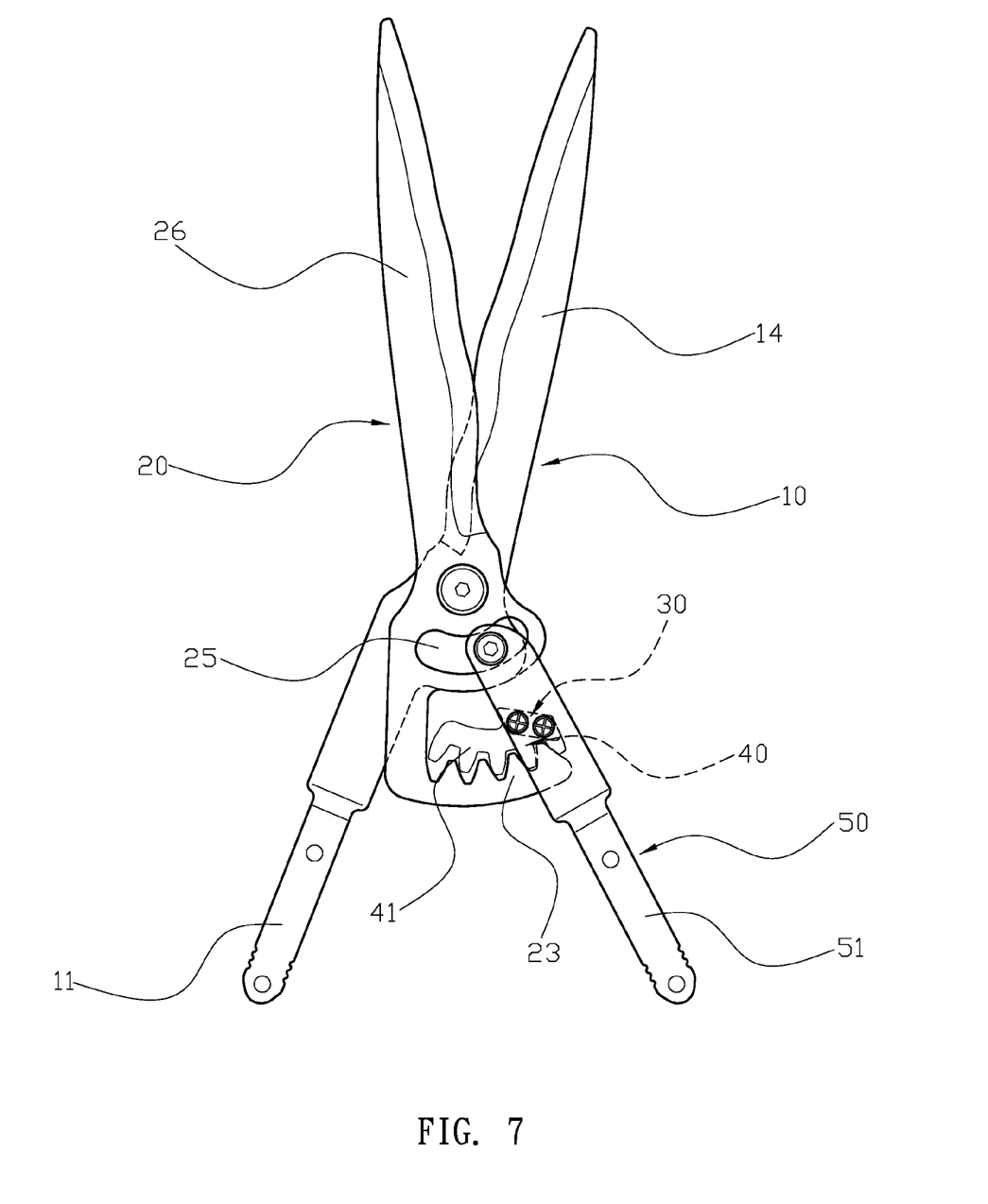
FIG. 7 shows another embodiment of the present invention.

Please refer again to FIG. 1 to FIG. 6 together with FIG. 7. The first and second cutting portions 14, 26 can be arranged in two different combinations, as shown in FIG. 1 to FIG. 6. One can provide a cutting edge while the other provides an anvil or pressing surface; alternatively, both cutting portions 14, 26 may provide cutting surfaces, as shown in FIG. 7.

With the above-mentioned garden shears, the following benefits can be obtained: 1. The second shear 20 is sandwiched between the two pressing arms 50; when a counterforce is generated because of the applied force, the counterforce is evenly distributed across the two pressing arms 50 disposed on two sides of the second shear 20 instead of being concentrated on a single side, which would otherwise difficulties in operation. 2. Since the screw moves along the limiting guide groove 25, a maximum opening angle between the first and second cutting portions 14, 26 is limited; the user does need to waste time to close the first and second cutting portions 14, 26. Furthermore, the range of the limiting guide groove 25 corresponds to the usable range of the garden shears, so the first and second cutting portions 14, 26 will not be separated with too narrow an angle, which would otherwise lead to difficult operations.

Although the present invention has been explained in relation to its preferred embodiment, it is to be understood that many other possible modifications and variations can be made without departing from the spirit and scope of the invention as hereinafter claimed.

What is claimed is:

1. A garden shears comprising a first shear, a second shear, a separator, an engaging member and two pressing arms, wherein:
a handle portion of the first shear is offset from a first cutting portion of the first shear, and a central portion of the first shear comprises a centrally positioned first pivot hole and an first eccentric pivot hole offset from and below the first pivot hole, and the first cutting portion is coupled to the upper portion of the first shear;
the second shear comprises a second pivot hole at a central portion, a side of the second shear having a strip-shaped extending portion, an end of the extending portion bent towards the other side of the second shear and having an engaging gear rack, the extending portion thereby defining an open region, an arcuate limiting guide groove disposed between the second pivot hole and the extending portion and above the open region, and an upper portion of the second shear further comprises a second cutting portion;
the separator comprises two assembly holes;
the engaging member comprises an arcuate engaging tip edge and a protrusion portion above one end of the engaging tip edge, and the protrusion portion has two assembly holes; the two pressing arms each having a handle at a lower portion, an eccentric pivot aperture at an upper portion, and two assembly holes that are disposed below the eccentric pivot aperture; the second shear and the first shear are attached via a first means for attaching extending through the first pivot hole and the second pivot hole, such that the second shear is overlapped on one side of the first shear; the separator is overlapped on the protrusion portion of the engaging member and disposed in the open region of the second shear with the engaging member such that the engaging gear rack engages with the engaging tip edge, and the two pressing arms sandwich the first shear, the second shear, the separator and the engaging member; a second means for attaching extends through the eccentric pivot apertures of the pressing arms, the limiting guide groove of the second shear, and the first eccentric pivot hole of the first shear; and a third and fourth means for attaching extending through respective ones of the assembly holes of the separator, the engaging member, and the pressing arms.

2. The garden shears as claimed in claim 1 wherein the first cutting portion is an anvil and the second cutting portion is a cutting blade.

3. The garden shears as claimed in claim 1 wherein both the first cutting portion and the second cutting portion are cutting blades.

* * * * *